United States Patent
Ting et al.

(10) Patent No.: US 11,354,465 B2
(45) Date of Patent: *Jun. 7, 2022

(54) FUNCTION SAFETY AND FAULT MANAGEMENT MODELING AT ELECTRICAL SYSTEM LEVEL (ESL)

(71) Applicant: Taiwan Semiconductor Manufacturing Co., Ltd., Hsinchu (TW)

(72) Inventors: Kai-Yuan Ting, San Jose, CA (US); Sandeep Kumar Goel, Dublin, CA (US); Yun-Han Lee, Baoshan Township (TW); Mei Wong, Saratoga, CA (US); Hsin-Cheng Chen, Chu-bei (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,313

(22) Filed: Sep. 14, 2020

(65) Prior Publication Data

US 2020/0410144 A1 Dec. 31, 2020

Related U.S. Application Data

(63) Continuation of application No. 15/691,920, filed on Aug. 31, 2017, now Pat. No. 10,776,538.

(Continued)

(51) Int. Cl.
*G06G 7/48* (2006.01)
*G06F 30/20* (2020.01)
(Continued)

(52) U.S. Cl.
CPC ............ *G06F 30/20* (2020.01); *G06F 30/367* (2020.01); *G06F 2119/06* (2020.01)

(58) Field of Classification Search
CPC ..... G06F 2119/06; G06F 30/20; G06F 30/367
See application file for complete search history.

(56) References Cited

U.S. PATENT DOCUMENTS 9,317,408 B2 * 4/2016 Szpak ................. G06F 11/3684
2008/0276206 A1 11/2008 Mariani
(Continued)

OTHER PUBLICATIONS

Carlsson, Pontus, and Sebastian Nilsson, "Remote Controlled Truck," Department of Signals and Systems, Chalmers University of Technology (2014) (118 pages).

(Continued)

*Primary Examiner* — Rehana Perveen
*Assistant Examiner* — Nithya J. Moll
(74) *Attorney, Agent, or Firm* — Sterne, Kessler, Goldstein & Fox P.L.L.C.

(57) ABSTRACT

Electronic system level (ESL) design and verification of the present disclosure is utilized to provide an electronic simulation and modeling of function safety and fault management of an electronic device. A method for simulating a safety circuit includes providing an electronic architectural design to perform one or more functional behaviors of the electronic device in accordance with an electronic design specification. The method further includes modeling the safety circuit of the electronic architectural design and one or more other electronic circuits of the electronic architectural design that communicate with the safety circuit. The method further includes simulating, using the modeling, operation of the safety circuit while the electronic architectural design is performing the one or more functional behaviors. The method also includes determining whether the simulated operation of the safety circuit satisfies the electronic design specification.

20 Claims, 10 Drawing Sheets

Related U.S. Application Data

(60) Provisional application No. 62/537,125, filed on Jul. 6, 2017.

(51) Int. Cl.
  *G06F 30/367* (2020.01)
  *G06F 119/06* (2020.01)

(56) References Cited

U.S. PATENT DOCUMENTS

| | | |
|---|---|---|
| 2014/0201583 A1 | 7/2014 | Thomas |
| 2015/0088476 A1 | 3/2015 | Guo et al. |
| 2019/0034566 A1 | 1/2019 | Ting et al. |

OTHER PUBLICATIONS

Chang, Kun-Jun, and Yung Yuan Chen, "System-Level Fault Injection in SystemC Design Platform," 2007 Proc. 8th Int. Symposium on Advanced Intelligent Systems. 2007 (6 pages).

Chang, Yung-Chang, et al., "Assessing Automotive Functional Safety Microprocessor with ISO 26262 Hardware Requirements," Technical Papers of 2014 International Symposium on VLSI Design, Automation and Test, IEEE (2014) (4 pages).

Delong, Todd A., Barry W. Johnson, and Joseph A. Profeta, "A Fault Injection Technique for VHDL Behavioral-Level Models," IEEE Design &Test of Computers 13.4 (1996); 24-33 (10 pages).

Diaconescu, Alexandra Ionut, "Automated Code Review for Fault Injection," Computer Engineering, Delft University of Technology (2013) (149 pages).

Hamber, Henrik, and Linus Skjutar Apell, "The Effects of Test Process Automation on Fault Frequency for a Spready System," KTH Royal Institute of Technology, School of Industrial Engineering and Management, May 31, 2016 (84 pages).

Han, Jinho et al., "80 μW/MHz, 850 MHz Fault Tolerant Processor with Fault Moniotr Systems," Journal of Semiconductor Technology and Science, vol. 17, No. 5, 627-635, Oct. 2017 (9 pages).

Rana, Rakesh, et al., "Improving Fault Injection in Automotive Model Based Development Using Fault Bypass Modeling," Informatik 2013—Informatik angepasst an Mensch, Organisation ung Umwelt (2013) (15 pages).

Sherer, Adam, John Rose, and Riccardo Oddone, "Ensuring Functional Safety Compliance for ISO 26262," 2015 52nd ACM/EDAC/IEEE Design Automation Conference (DAC). IEE, 2015 (3 Pages).

* cited by examiner

FUNCTION SAFETY AND FAULT MANAGEMENT MODELING AT ELECTRICAL SYSTEM LEVEL (ESL)

CROSS REFERENCE TO RELATED APPLICATIONS

The present application is a continuation of U.S. Nonprovisional patent application Ser. No. 15/691,920, filed on Aug. 31, 2017 and titled "Function Safety and Fault Management Modeling at Electrical System Level (ESL)," which claims the benefit of U.S. Provisional Patent Application No. 62/537,125, filed on Jul. 26, 2017 and titled "Function Safety and Fault Management Modeling at Electrical System Level (ESL)," all of which are hereby incorporated by reference in their entireties.

BACKGROUND

Manufacturers of automobiles are integrating more electronic systems such as computers, or computer systems having multiple computers, including a data storage device into their automobiles. If the functional safety of these electronic systems are not tested and/or guaranteed to some extent, failures in one or more of the electronic systems can lead to a catastrophic failure of the automobile. Fortunately, the International Organization for Standardization (ISO) has prescribed an international standard, namely ISO26262, for functional safety of electronic systems in production automobiles.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

Figure 1:
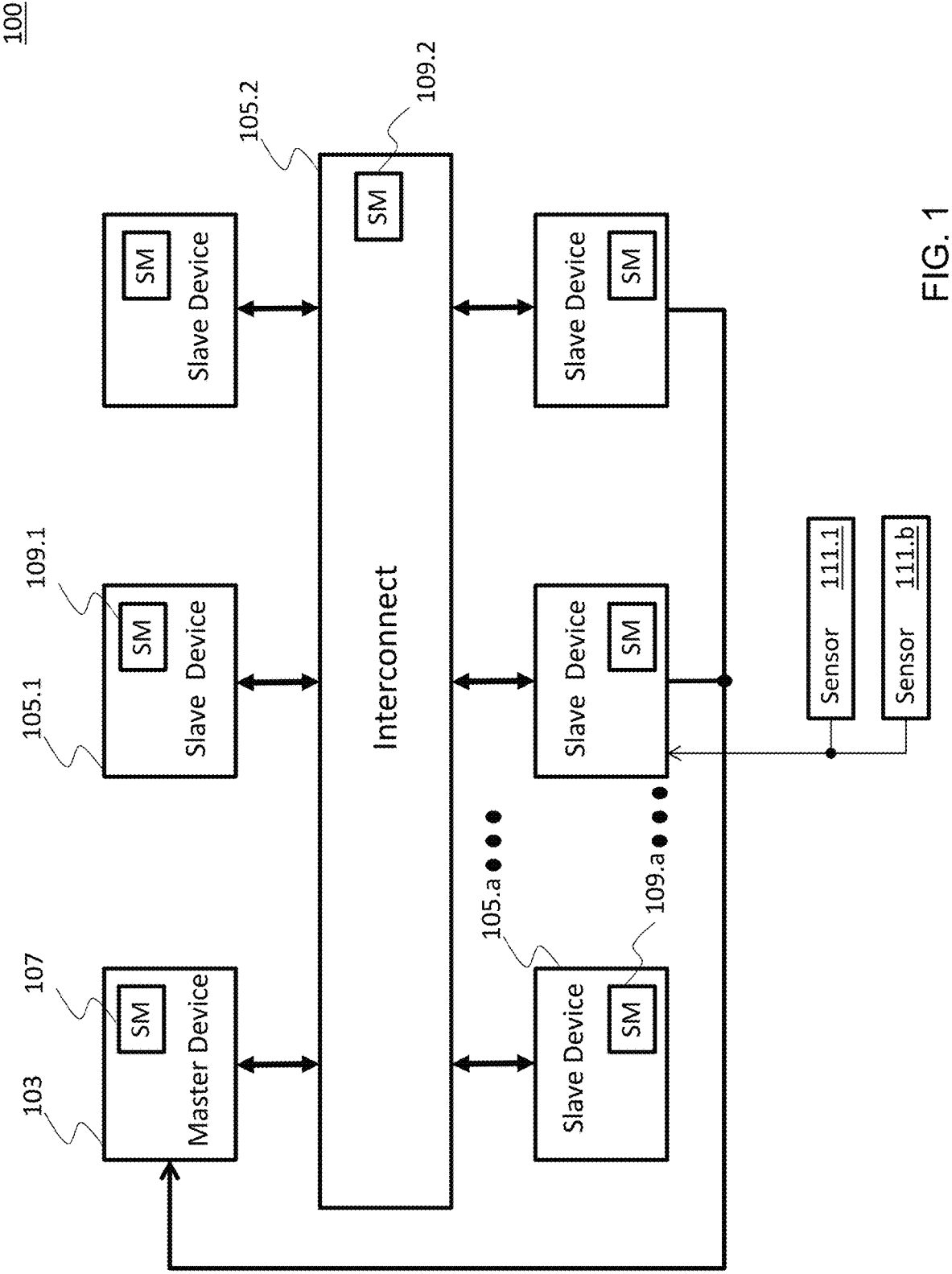
FIG. 1 illustrates a block diagram of an electronic device according to an exemplary embodiment of the present disclosure.

The present disclosure will now be described with reference to the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is does not in itself dictate a relationship between the various embodiments and/or configurations discussed.

Overview

Electronic systems can include one or more components such as, but not limited to, one or more Central Processing Units (CPU), one or more General Purpose Input Output (GIPO), one or more System Programming Units (SPU), one or more memories (such as, but not limited to, Static random-access memory (SRAM)), one or more Inter Integrated Circuits (I2C), one or more Liquid Crystal Display Controllers (LCDC), one or more Interconnection Circuits (AXI), and/or any other suitable component that will be apparent to those skilled in the relevant art(s) without departing form the spirit and scope of the present disclosure. In some situations, one or more of these components can include safety circuits to ensure functional safety of these components and/or provide fault management of these components. In an exemplary embodiment, the functional safety represents an absence of unreasonable risk due to hazards caused by malfunctioning behavior of the electronic system as defined in ISO26262, which is incorporated by reference in its entirety. In this exemplary embodiment, the ISO26262 defines a fault as being an abnormal condition that can cause one or more of these components to fail.

It is important to test the safety circuits during design and implementation of the components of the electronic systems. Electronic design automation (EDA), also referred to as electronic computer-aided design (ECAD), represents as a category of software tools available to designers and manufacturers for designing electronic systems. One type of EDA is referred to as electronic system level (ESL) design and verification, which is an electronic design and verification methodology, focused on higher abstraction level concerns. Generally, the electronic system level (ESL) design and verification provides a mechanism for system design, verification, and debugging through a software implementation of the electronic systems. In this disclosure, the ESL design and verification is utilized to provide a software model of the electronic systems using a high-level software modeling language, such as a graphical design tool, for example C, C++, LabVIEW, and/or MATLAB, a general purpose system design language, such as like SysML, SMDL and/or SSDL, or any other suitable high-level software modeling language that will be apparent to those skilled in the relevant art(s) without departing from the spirit and scope of the present disclosure.

The ESL design and verification of the present disclosure is utilized to provide an electronic simulation of fault injection and safety verification. Before this electronic simulation occurs, the electronic device is modeled using the high-level software modeling language. For example, one or more master device models, one or more slave device models, and/or one or more safety circuit models are used to model behaviors of the one or more master devices, the one or more slave devices, and/or the safety circuits, respectively, of the electronic systems. According to some examples, the master device may have control over one or more slave devices. As a non-limiting example, the master device can include a Central Processing Units (CPU) and the slave device can include an Interconnection Circuit (AXI), an Inter Integrated Circuit (I2C), a General-purpose input/output (GPIO), a Static random-access memory (SRAM), and a system configuration unit (SCU). In this non-limiting example, CPU can control one or more of AXI, I2C, GPIO, and SRAM by, for example, generating commands for the one or more of AXI, I2C, GPIO, SRAM, SCU to execute. In this example, these models are used to simulate fault injection and safety verification for the electronic systems.

After completion of the modeling of the electronic systems, the ESL design and verification of the present disclosure utilizes a simulation algorithm, such as SPICE, Verilog, or VHDL to provide some examples, on the software model of the electronic systems to simulate the fault injection and safety verification. For example, this simulation algorithm utilizes a text netlist describing the software model of the electronic systems and translates this text netlist into one or more equations, such as nonlinear differential algebraic equations to provide an example, to be solved. For example, the simulation algorithm can provide an alternating current (AC) analysis, such as a linear small-signal frequency domain analysis, and/or a (DC) analysis, such as a nonlinear quiescent point calculation or a sequence of nonlinear operating points calculated while sweeping an input voltage or current, or a parameter, of the software model of the electronic systems to simulate the fault injection and safety verification.

An Exemplary Electronic Device

FIG. 1 is a block diagram of an electronic device according to an exemplary embodiment of the present disclosure. According to some examples, the electronic device 100 can be used within an automobile and/or any other motorized vehicle. An electronic device 100 represents a specific arrangement of one or more electronic circuits, such as analog circuits and/or digital circuits to provide some examples, which are specifically designed and manufactured to perform one or more functions. According to some examples, the functions performed by electric device 100 can include suitable mechanical, electrical, and/or electro-mechanical functions performed within an automobile and/or any other motorized vehicle. For example, functions from setting seats, mirrors, climate control, and headlights to advanced engine control of the automobiles. For example, the functions performed by electric device 100 can include monitoring and/or controlling one or more anti-lock braking (ABS) sensors, one or more traction control system sensors, one or more steering lock sensors, one or more speed sensors, one or more yaw rate sensors, etc. In some situations, the functions performed by electric device 100 can include functions to ensure functional safety of the components of electric device 100 and/or to provide fault management of these components. The one or more electronic circuits can include one or more interconnected electronic components that are manufactured and/or designed for placement on a printed circuit board (PCB) and/or a semiconductor substrate. As illustrated in FIG. 1, the electronic device 100 includes a master device 103 (e.g., a master circuit), one or more slave devices 105.1 through 105.$a$ (e.g., slave circuits). The master device 103 and/or the one or more slave device 105.1 through 105.$a$ can include one or more analog circuits, digital circuits, and/or other suitable mechanical, electrical, and/or electro-mechanical circuits that will be apparent to those skilled in the relevant art(s) without departing from the spirit and scope of the present disclosure. In an exemplary embodiment, the one or more analog circuits, the one or more digital circuits, and/or the other suitable mechanical, electrical, and/or electro-mechanical circuits can represent one or more one or more Central Processing Units (CPUs), one or more General Purpose Input Outputs (GIPOs), one or more memories, one or more application-specific integrated circuits (ASICs), one or more System Programming Units (SPU), one or more Inter Integrated Circuits (I2Cs), one or more Liquid Crystal Display Controllers (LCDC), one or more Interconnection Circuits (AXIs), one or more video encoders/decoders, one or more Digital Signal Processors (DSPs) and/or one or more physical layer (PHY) devices to provide some examples. Additionally, or alternatively, the one or more analog circuits, the one or more digital circuits, and/or the other suitable mechanical, electrical, and/or electro-mechanical circuits can be within an automobile and/or any other motorized vehicle that will be apparent to those skilled in the relevant art(s) without departing form the spirit and scope of the present disclosure.

As illustrated in FIG. 1, the master device 103 and the one or more slave devices 105.1 through 105.$a$ include a safety circuit SM 107 and safety circuits SM 109.1 through 109.$a$, respectively. During operation, the safety circuit SM 107 and/or the safety circuits SM 109.1 through 109.$a$ monitor the master device 103 and/or the one or more slave devices 105.1 through 105.$a$, respectively. The safety circuit SM 107 and/or the safety circuits SM 109.1 through 109.$a$ generate one or more fault signals when the monitoring indicates one or more faults are present within the master device 103, the one or more slave devices 105.1 through 105.$a$, and/or any other suitable circuit of the electronic device 100 that will be apparent to those skilled in the relevant art(s) without departing from the spirit and scope of the present disclosure. This other suitable circuit can include one or more sensors 111.1 through 111.$b$ as illustrated in FIG. 1. The one or more sensors 111.1 through 111.$b$ can be within a motorized vehicle such as one or more anti-lock braking (ABS) sensors, one or more traction control system sensors, one or more steering lock sensors, one or more speed sensors, one or more yaw rate sensors, and/or any other sensing component that will be apparent to those skilled in the relevant art(s) without departing form the spirit and scope of the present disclosure. In an exemplary embodiment, the one or more faults can represent an abnormal condition that can cause the electronic device 100 to fail, a discrepancy between specified or theoretically correct values or conditions and actual values or conditions, a termination of an ability of the electronic device 100 to perform a function, and/or a failure or an unintended behavior of the electronic device 100 with respect to its design intent to provide some examples.

In some situations, the safety circuit SM 107 and/or the safety circuits SM 109.1 through 109.$a$ send these fault signals to other circuits within the electronic device 100 such that these other circuits within the electronic device 100 can appropriately respond to the one or more faults. For example, the safety circuit SM 109.*a* can monitor the slave component slave device 105.*a* and generate a fault when the one or more faults occur within the slave device 105.*a* and/or within other circuits communicatively coupled to the slave device 105.*a*. In this example, the safety circuit SM 109.*a* alone, or in combination with a fault monitor and/or a fault injection (as discussed in more detail below), triggers an interrupt to the master device 103. When the master device 103 receives the interrupt, the master device 103 acknowledges the interrupt and/or triggers one or more of the one or more slave devices 105.1 through 105.*a* to handle the fault.

Modeling of the Electronic Device

Figure 2:
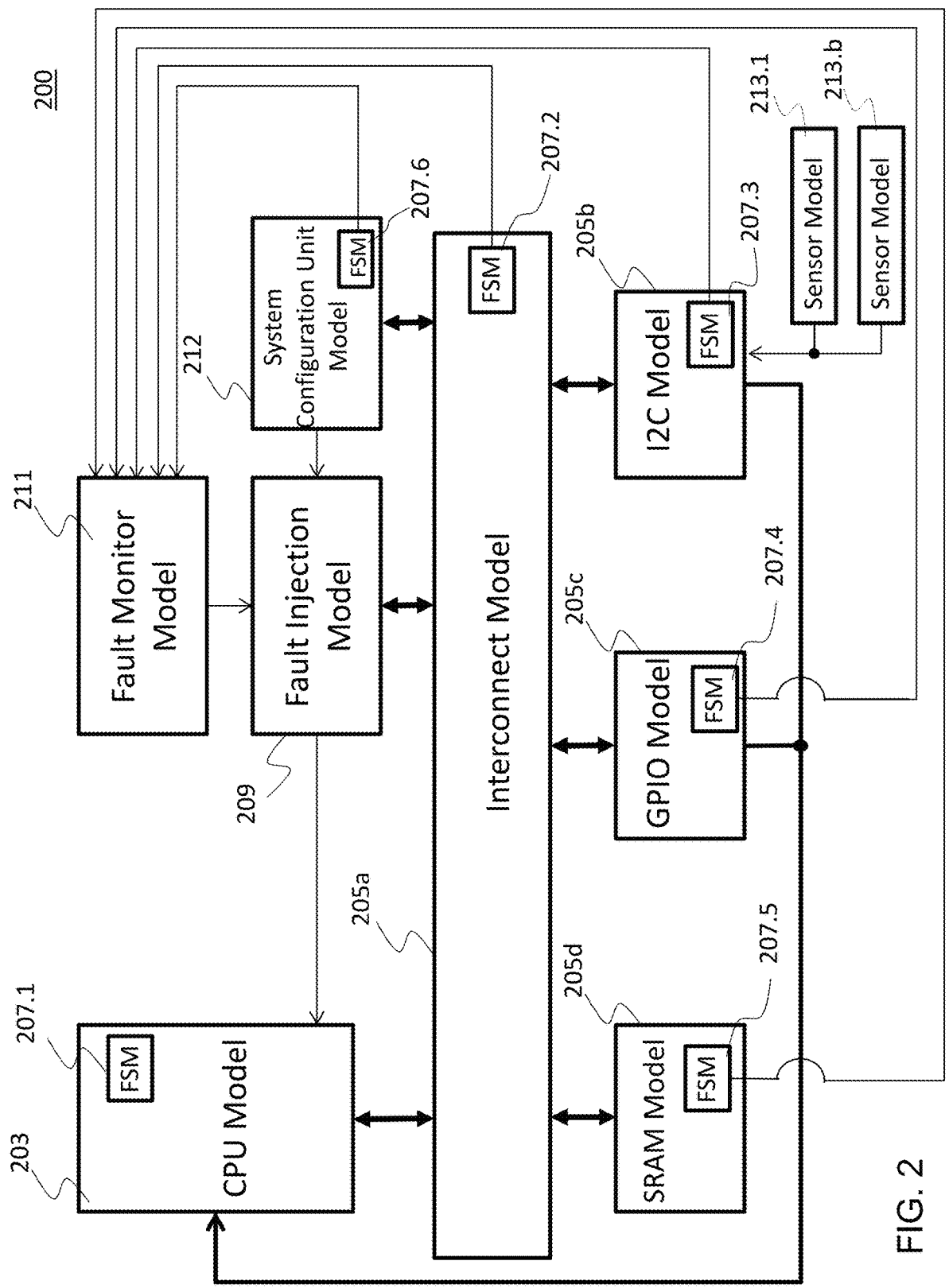
FIG. 2 illustrates exemplary software models for the electronic device according to an exemplary embodiment of the present disclosure.

FIG. 2 illustrates exemplary software models for the electronic device 100 according to an exemplary embodiment of the present disclosure. As discussed above, the ESL design and verification provides a mechanism for system design, verification, and debugging through a software implementation of the electronic device 100. Although the ESL design and verification is available to design, to verify, and to debug a wide-variety of aspects of the electronic device 100, the present disclosure utilizes the ESL design and verification to provide a software model of fault injection and safety verification using the high-level software modeling language. Those skilled in the relevant art(s) will recognize that other ESL designs and verifications are available to design, to verify, and to debug other aspects of the electronic device 100 and these other ESL designs and verifications can be used in conjunction with the ESL design and verification disclosed herein to design, to verify, and to debug the electronic device 100 without departing from the spirit and scope of the present disclosure. A software model 200 of an electronic device as illustrated in FIG. 2 represents a software model of the electronic device 100 as described above in FIG. 1. For example, the software model 200 can represents a software model of the electronic device 100 in systemC. The software model 200 can be generated and can be simulated on, for example, the computer system 800 of FIG. 8. Those skilled in the relevant art(s) will recognize that the teachings herein are equally applicable to provide software models for other electronic devices without departing from the spirit and scope of the present disclosure. As illustrated in FIG. 2, a CPU model 203 can represent a software model for exemplary embodiment of the master circuit 103 and an interconnect model 205*a*, an I2C model 205*b*, a GPIO model 205*c*, a SRAM model 205*d*, and a system configuration unit model 212 can represent software models for exemplary embodiments of the one or more slave circuits 105.1 through 105.*a*. Also sensor models 213.1 through 213.*b* can represent a software model for exemplary embodiment of the sensors 111.1 through 111.*b*. As additionally illustrated in FIG. 2, the software model 200 can include one or more function safety models 207.1 through 207.6 corresponding to the CPU model 203, the interconnect model 205*a*, the I2C model 205*b*, the GPIO model 205*c*, SRAM model 205*d*, and system configuration unit model 212, respectively. In an exemplary embodiment, the one or more function safety models 207.1 through 207.5 correspond to one or more of the safety circuits 109.1 through 109.*a*. Also, as illustrated in FIG. 2, software model 200 can include a system configuration unit model 212. System configuration unit model 212 can be configured to configure the parameters of the CPU model 203, the interconnect model 205*a*, the I2C model 205*b*, the GPIO model 205*c*, the SRAM model 205*d*, the fault injection model 209, and/or the fault monitor model 211. In other words, the system configuration unit model 212 can include parameters used for these models and provide a platform to change, adjust, and/or set the parameters used for these models. According to some examples, the system configuration unit model 212 can also include a function safety model 207.6

During operation, the high-level software code associated with the CPU model 203, the Interconnect model 205*a*, the I2C model 205*b*, the GPIO model 205*c*, the SRAM model 205*d*, and/or the system configuration unit model 212 can be specifically manipulated to insert the one or more faults as discussed above in FIG. 1. Thereafter, the CPU model 203, the Interconnect model 205*a*, the I2C model 205*b*, the GPIO model 205*c*, the SRAM model 205*d*, and/or the system configuration unit model 212 with the one or more faults can be simulated to trigger the one or more faults. The one or more function safety models 207.1 through 207.6 detect the one or more faults through monitoring the CPU model 203, the Interconnect model 205*a*, the I2C model 205*b*, the GPIO model 205*c*, the SRAM model 205*d*, and/or the system configuration unit model 212 at a component level during the simulation. In this example, the one or more function safety models 207.1 through 207.6 monitors CPU model 203, the Interconnect model 205*a*, the I2C model 205*b*, the GPIO model 205*c*, the SRAM model 205*d*, and/or the system configuration unit model 212 individually without considering how each of models 203, 205*a-d*, and 212 work with others. In other words, the one or more function safety models 207.1 through 207.6 monitors the functionality of each of the models without considering how each model work with other models. Alternatively, or in addition to, the one or more function safety models 207.1 through 207.6 detect the one or more faults through monitoring the CPU model 203, the Interconnect model 205*a*, the I2C model 205*b*, the GPIO model 205*c*, the SRAM model 205*d*, and/or the system configuration unit model 212 at a system level during the simulation. In this example, the one or more function safety models 207.1 through 207.6 monitors CPU model 203, the Interconnect model 205*a*, the I2C model 205*b*, the GPIO model 205*c*, the SRAM model 205*d*, and/or the system configuration unit model 212 individually and also considering how one or more of models 203, 205*a-d*, and 212 work with other models. In other words, the one or more function safety models 207.1 through 207.6 monitors the functionality of one or more of the models considering how the one or more models work with other models.

According to some embodiments, each of the CPU model 203, Interconnect model 205*a*, I2C model 205*b*, GPIO model 205*c*, SRAM model 205*d*, and system configuration unit model 212 (or any other master model and/or slave model) can include a dedicated function safety model 207. In these embodiments, software model 200 can include one independent fault injection model 209 and one independent fault monitor model 211. Additionally, or alternatively, according to some embodiments, each of the CPU model 203, Interconnect model 205*a*, I2C model 205*b*, GPIO model 205*c*, SRAM model 205*d*, and system configuration unit model 212 (or any other master model and/or slave model) can include a dedicated function safety model 207 and one dedicated fault monitor model 211. In these embodiments, software model 200 can include one independent fault injection model 209. Additionally, or alternatively, according to some embodiments, each of the CPU model 203, Interconnect model 205*a*, I2C model 205*b*, GPIO model 205*c*, SRAM model 205*d*, and system configuration unit model 212 (or any other master model and/or slave model) can include a dedicated function safety model 207, one dedicated fault monitor model 211, and one dedicated fault injection model 209. Additionally, or alternatively, function safety model 207, the fault injection model 209, and/or the fault monitor model 211 and/or all or part of their functions can be combined.

As discussed in more detail below, one or more of function safety model 207, fault injection model 209, and fault monitor model 211 are used to model one or more safety circuits 107 and/or 109.1 through 109a of FIG. 1.

It is noted that although CPU model 203, Interconnect model 205a, I2C model 205b, GPIO model 205c, SRAM model 205d, and the system configuration unit model 212 are shown in FIG. 2, software model 200 can include any other master model and/or slave model. Also, it is noted that although six function safety models 207.1 through 207.6 are illustrated, this is an exemplary illustration and any number of function safety models 207 can be used. For example, each of the CPU model 203, Interconnect model 205a, I2C model 205b, GPIO model 205c, SRAM model 205d, and the system configuration unit model 212 (or any other master model and/or slave model) can include zero, one, or more function safety models 207. Additionally, or alternatively, software model 200 can include one or more fault injection model 209 and/or one or more fault monitor model 211.

Exemplary Software Model for a Slave Model with a Function Safety Model

Figure 3A:
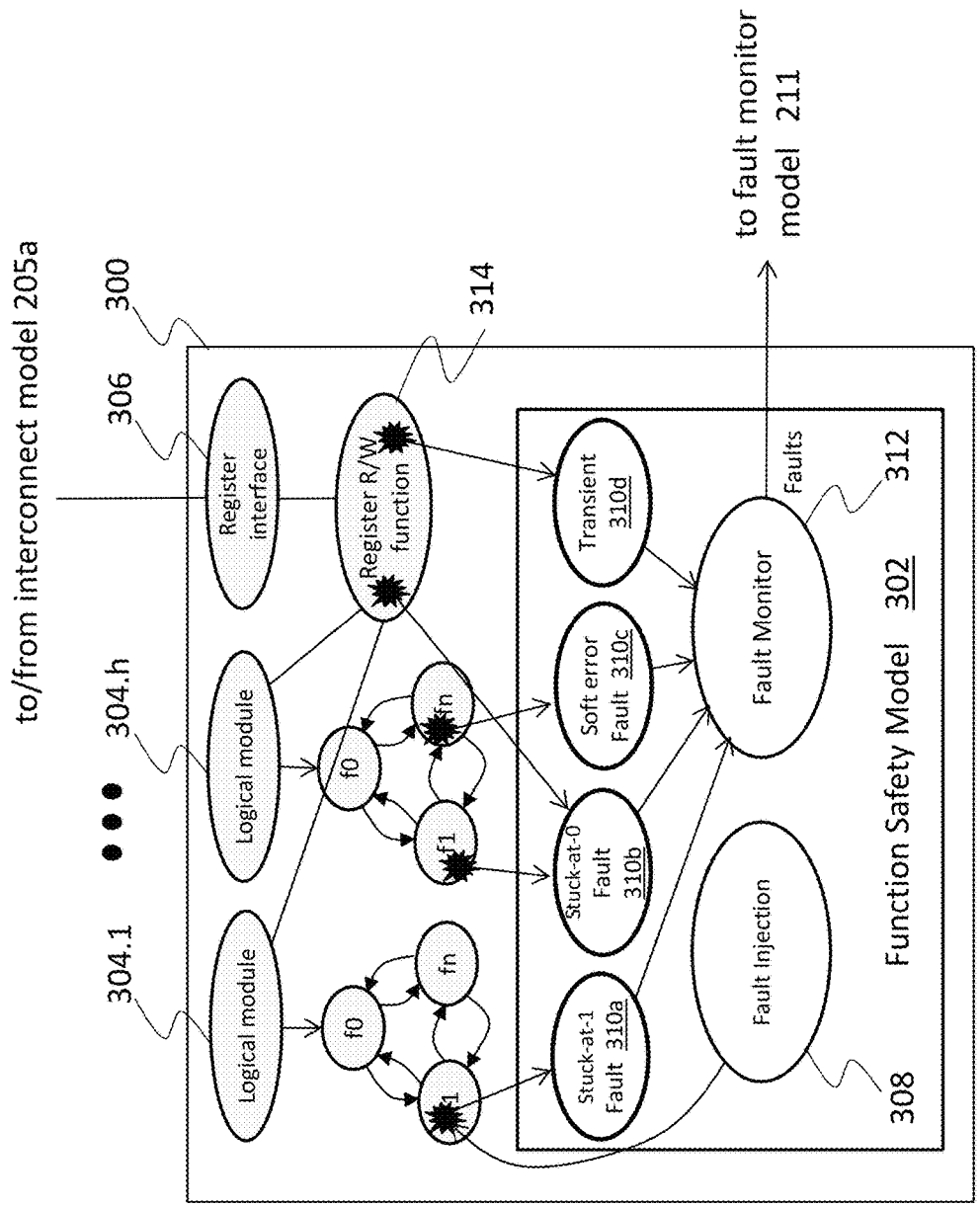
FIG. 3A illustrates exemplary software models for a slave model and function safety model according to an exemplary embodiment of the present disclosure.

FIG. 3A illustrates an exemplary software model for a slave model with a function safety model according to an exemplary embodiment of the present disclosure. As illustrated in FIG. 3A, a slave model 300 can represent an exemplary embodiment of a software model for one or more of the one or more slave circuits 105.1 through 105.a (e.g., the Interconnect model 205a, the I2C model 205b, the GPIO model 205c, the SRAM model 205d, and/or system configuration unit model 212) and a function safety model 302 can represent an exemplary embodiment of a software model for the one or more safety circuits 109.1 through 109.a (e.g., one or more function safety models 207.2 through 207.6). As illustrated in FIG. 3A, the slave model 300 includes one or more logical modules 304.1 through 304.h and a register interface 306. The one or more logical modules 304.1 through 304.h are each designed to perform an interconnected series of functions, denoted f0 through fn in FIG. 3A. According to some embodiments, the interconnected series of functions denoted f0 through fn can be performed by a state machine. The state machine can be defined by its initial state, a list of its states (e.g., f0 through fn), and the conditions for each transition. The states can be functionally interconnected based on the conditions for transition between the states. In an exemplary embodiment, the high-level software modeling language uses software representations of one or more logical gates, such as logical AND gates, logical OR gates, logical XOR gates, logical XNOR gates, and/or logical NOT gates to provide some examples, to model the interconnected series of functions f0 through fn for each of the one or more logical modules 304.1 through 304.h. Also, the high-level software modeling language uses software representations of the one or more logical gates to model a register read/write (R/W) function 314 to read and/or write data from/to the register interface 306. According to some examples, register interface 306 can be coupled to interconnect model 205a. Also, register read/write (R/W) function 314 can be coupled to logical modules 304.1 through 304.h.

According to a non-limiting example, the slave model 300 is discussed with respect to the I2C model 205b. In this example, the register interface 306, which is coupled to the interconnect model 205a, can receive a read or write instruction from the CPU model 203 through the interconnect model 205a. In this examples, the CPU model 203 can instruct the slave model 300 to read (or write) from (or to) the one or more sensor models 213.1 through 213.b. The register interface 306 is coupled to the register R/W function 314 and the register interface 306 forwards the read (or write) instruction to the register R/W function 314. After receiving the instruction, the register R/W function 314 can determine whether the instruction is a read or a write instruction. Depending on the type of the instruction, the register R/W function 314 can trigger the one or more logical modules 304.1 through 304.h to perform the instruction received from CPU model 203. For example, after determining that the instruction is a read instruction, the register R/W function 314 can trigger the logical module 304.1 to perform the requested read instruction.

During operation, the high-level software modeling language can generate one or more faults within slave model 300 by manipulating one or more of the one or more logical gates of the interconnected series of functions f0 through fn and/or the register R/W function. According to some embodiments, the fault injection module 308 can be configured to generate the one or more faults within slave model 300. For example, when the slave model 300 and/or the fault injection module 308 is generated/modeled, the fault injection module 308 can be programmed with one or more faults and the time periods to generate and apply the one or more faults. Additionally or alternatively, a user of the system applying the high-level software modeling language can trigger the fault injection module 308 to generate and apply the one or more faults. As a non-limiting example, during operation, the high-level software modeling language can manipulate a logical gate used to model function f1 of logical model 304.1 to always stay at logic 1. As another non-limiting example, during operation, the high-level software modeling language can manipulate a logical gate used to model function f1 of logical model 304.h to always stay at logic 0. Accordingly, the high-level software modeling language can generate one or more faults within slave model 300 by manipulating one or more of the one or more logical gates of the interconnected series of functions f0 through fn and/or the register R/W function.

As illustrated in FIG. 3A, the function safety model 302 (which can represent an exemplary embodiment of a software model for the one or more safety circuits 109.1 through 109.a (e.g., one or more function safety models 207.2 through 207.6 of FIG. 2) includes a fault injection module 308, a fault monitor module 312, a stuck-at-1 fault module 310a, a stuck-at-0 fault module 310b, a soft error module 310c, and a transient fault module 310d. As discussed above, in an exemplary embodiment, the fault injection module 308 manipulates the one or more of the one or more logical gates of the interconnected series of functions f0 through fn and/or the register R/W function to generate one or more faults within the slave model 300. For example, the one or more faults are generated within one or more of the one or more logical gates of the interconnected series of functions f0 through fn and/or the register R/W function of the slave model 300. In this exemplary embodiment, the fault injection module 308 specifically manipulates the one or more of the one or more logical gates of functions f0 through fn and/or the register R/W function based upon a type of fault, such as a stuck-at-1 fault, a stuck-at-0 fault, a soft error, and a transient fault to provide some examples, to be inserted into the slave model 300. It is noted that the fault injection module 308 can triggers other types of faults that will be apparent to those skilled in the relevant art(s) without departing from the spirit and scope of the present disclosure. These other faults can include, but are not limited to, lock-step fault (for example, for CPUs), error correcting code (ECC) faults, etc. The fault injection module 308 is a local fault injection module for the slave model 300. In other words, the fault injection module 308 can generate one or more faults within the slave model 300 individually at a component level without considering how the slave model 300 works with other master and/or slave models. In contrast, the fault injection model 209 of FIG. 2 is a global fault injection model for the software model 200. In other words, the fault injection model 209 can generate one or more faults within the software model 200 at a system level where how the master and/or slave models work with each other within the software model 200.

During operation, the function safety model 302 (using, for example, the fault injection module 308) triggers and/or generates fault in one or more functions, denoted as f0 through fn in FIG. 3A, of the slave model 300. According to some examples, the function safety model 302 generates the fault randomly. For example, the function safety model 302 chooses randomly between different faults and/or applies the fault randomly to different functions of the slave model 300. Additionally, or alternatively, where the fault is applied can be random or can be derived based on criticalness of components. For example, to which one of the one or more of the one or more logical gates of the interconnected series of functions f0 through fn and/or the register R/W function of the slave model 300 the fault is applied can be random or can be derived based on criticalness of components. As illustrated in FIG. 3A, the function safety model 302 triggers one or more faults in the slave model 300. The function safety model 302 triggers these fault in any suitable location within the slave model 300. The suitable location may include which one of the one or more of the one or more logical gates of the interconnected series of functions f0 through fn and/or the register R/W function of the slave model 300 based on, for example, criticalness of components. After triggering the one or more faults, the function safety model 302 delivers (using, for example, the fault monitor module 312) the one or more faults to fault monitor model 211 for further processing.

During simulation of the slave model 300 by the high-level software modeling language, the stuck-at-1 fault module 310a, the stuck-at-0 fault module 310b, the soft error module 310c, and the transient fault module 310d alone or in combination with fault monitor 312 can monitor the one or more logical modules 304.1 through 304.h and the register R/W function 314 for the one or more faults as discussed above in FIG. 1. If the monitoring determines the one or more faults to be present, the stuck-at-1 fault module 310a, the stuck-at-0 fault module 310b, the soft error module 310c, and the transient fault module 310d characterize the one or more faults as being the stuck-at-1 fault, the stuck-at-0 fault, the soft error, and the transient fault, respectively. Thereafter, the stuck-at-1 fault module 310a, the stuck-at-0 fault module 310b, the soft error module 310c, and the transient fault module 310d provide their characterization of the one or more faults, if any, to the fault monitor 312. The fault monitor module 312 is a local fault monitor module for the slave model 300. In contrast, the fault monitor model 211 of FIG. 2 is a global fault monitor module for software model 200. As discussed above, the characterization can include an indication of whether the one or more faults are the stuck-at-1 fault, the stuck-at-0 fault, the soft error, and/or the transient fault. Additionally or alternatively, the characterization can include information about one or more logical gates of the interconnected series of functions f0 through fn and/or the register R/W function at which the one or more faults occurred. The fault monitor 312 catalogs the one or more faults as being the stuck-at-1 fault, the stuck-at-0 fault, the soft error, and/or the transient fault and can optionally generate a report of the one or more faults. The fault monitor 312 of function safety model 302 can deliver the one or more faults and/or the report of the one or more faults to fault monitor model 211 for further processing. As discussed above, the fault monitor module 312 is a local fault monitor module for the slave model 300. In other words, the fault monitor module 312 can monitor the slave model 300 individually at a component level without considering how it works with other master and/or slave models. In contrast, the fault monitor model 211 of FIG. 2 is a global fault monitor model for the software model 200. In other words, the fault monitor module 211 can monitor the software model 200 at a system level considering how the master and/or slave models work with each other within the software model 200.

Exemplary Software Model for a Master Model with a Function Safety Model

Figure 3B:
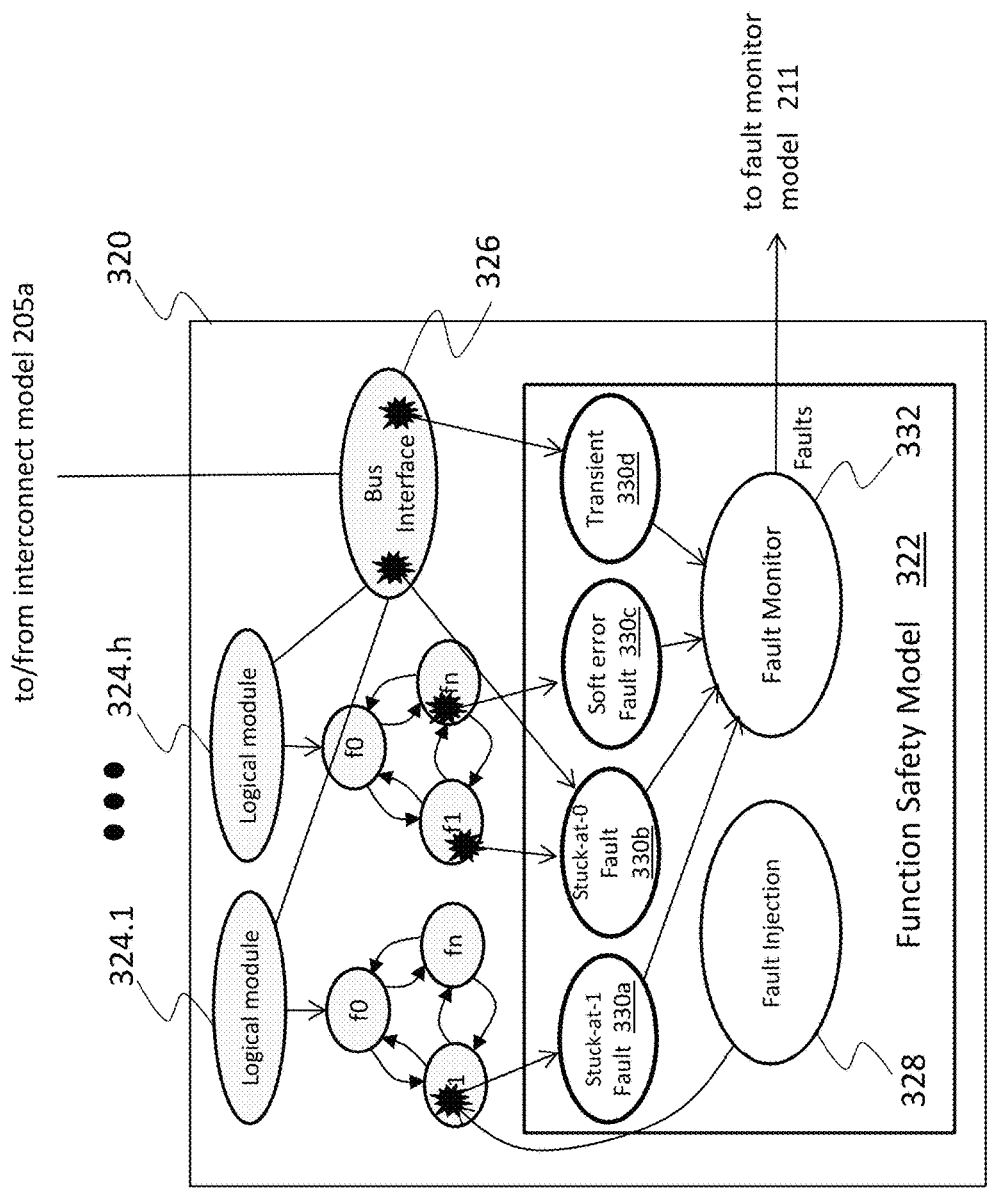
FIG. 3B illustrates exemplary software models for a master model and function safety model according to an exemplary embodiment of the present disclosure.

FIG. 3B illustrates an exemplary software model for a master model with a function safety model according to an exemplary embodiment of the present disclosure. As illustrated in FIG. 3B, a master model 320 can represent an exemplary embodiment of a software model for one or more master circuits 103 (e.g., the master model 203) and a function safety model 322 can represent an exemplary embodiment of a software model for the one or more safety circuits 107 (e.g., one or more function safety models 207.1). As illustrated in FIG. 3B, the master model 320 includes one or more logical modules 324.1 through 324.h and a bus interface 326. The one or more logical modules 324.1 through 324.h are each designed to perform an interconnected series of functions, denoted f0 through fn in FIG. 3B. According to some embodiments, the interconnected series of functions denoted f0 through fn can be performed by a state machine. The state machine can be defined by its initial state, a list of its states (e.g., f0 through fn), and the conditions for each transition. The states can be functionally interconnected based on the conditions for transition between the states. In an exemplary embodiment, the high-level software modeling language uses software representations of one or more logical gates, such as logical AND gates, logical OR gates, logical XOR gates, logical XNOR gates, and/or logical NOT gates to provide some examples, to model the interconnected series of functions f0 through fn for each of the one or more logical modules 324.1 through 324.h. According to some examples, the one or more logical modules 324.1 through 324.h and their corresponding functions model the operations performed by master model 320.

The one or more logical modules 324.1 through 324.h can communicate with interconnect model 205a through, for example, the bus interface 326. In other words, according to some examples, the bus interface 326 can be coupled to interconnect model 205a and also to the one or more logical modules 324.1 through 324.h. Using the one or more logical modules 324.1 through 324.h and the bus interface 326, master model 320 can send commands to, for example, slave models 205a through 205d, sensor models 213.1 through 213.b, and/or system configuration unit model 212. According to some embodiments, the bus interface 326 can also include a logical module including interconnected series of functions. The bus interface 326 can be configured to receive the master model's commands (from the one or more logical modules 324.1 through 324.*h*) and forward the commands to the slave models through interconnect model 205*a*.

During operation, the high-level software modeling language can generate one or more faults within master model 320 by manipulating one or more of the one or more logical gates of the interconnected series of functions f0 through fn and/or the bus interface. According to some embodiments, the fault injection module 328 can be configured to generate the one or more faults within master model 320. For example, when the master model 320 and/or the fault injection module 328 is generated/modeled, the fault injection module 328 can be programmed with one or more faults and the time periods to generate and apply the one or more faults. Additionally or alternatively, a user of the system applying the high-level software modeling language can trigger the fault injection module 328 to generate and apply the one or more faults. As a non-limiting example, during operation, the high-level software modeling language can manipulate a logical gate used to model function f1 of logical model 324.1 to always stay at logic 1. As another non-limiting example, during operation, the high-level software modeling language can manipulate a logical gate used to model function f1 of logical model 324.*h* to always stay at logic 0. Accordingly, the high-level software modeling language can generate one or more faults within mater model 320 by manipulating one or more of the one or more logical gates of the interconnected series of functions f0 through fn and/or the bus interface.

As illustrated in FIG. 3B, the function safety model 322 (which can represent an exemplary embodiment of a software model for the one or more safety circuits 107 (e.g., one or more function safety models 207.1 of FIG. 2) includes a fault injection module 328, a fault monitor module 332, a stuck-at-1 fault module 330*a*, a stuck-at-0 fault module 330*b*, a soft error module 330*c*, and a transient fault module 330*d*. As discussed above, in an exemplary embodiment, the fault injection module 328 manipulates the one or more of the one or more logical gates of the interconnected series of functions f0 through fn and/or the bus interface to generate one or more faults within the master model 320. For example, the one or more faults are generated within one or more of the one or more logical gates of the interconnected series of functions f0 through fn and/or the bus interface of the master model 320. In this exemplary embodiment, the fault injection module 328 specifically manipulates the one or more of the one or more logical gates of functions f0 through fn and/or the register R/W function based upon a type of fault, such as a stuck-at-1 fault, a stuck-at-0 fault, a soft error, and a transient fault to provide some examples, to be inserted into the master model 320. It is noted that the fault injection module 328 can trigger other types of faults that will be apparent to those skilled in the relevant art(s) without departing from the spirit and scope of the present disclosure. These other faults can include, but are not limited to, lock-step fault (for example, for CPUs), error correcting code (ECC) faults, etc. The fault injection module 328 is a local fault injection module for the master model 320. In other words, the fault injection module 328 can generate one or more faults within the master model 320 individually at a component level without considering how the master model 320 works with other master and/or slave models. In contrast, the fault injection model 209 of FIG. 2 is a global fault injection model for the software model 200. In other words, the fault injection model 209 can generate one or more faults within the software model 200 at a system level where how the master and/or slave models work with each other within the software model 200.

During operation, the function safety model 322 (using, for example, the fault injection module 328) triggers and/or generates fault in one or more functions, denoted as f0 through fn in FIG. 3B, of the master model 320. According to some examples, the function safety model 322 generates the fault randomly. For example, the function safety model 322 chooses randomly between different faults and/or applies the fault randomly to different functions of the master model 320. Additionally, or alternatively, where the fault is applied can be random or can be derived based on criticalness of components. For example, to which one of the one or more of the one or more logical gates of the interconnected series of functions f0 through fn and/or the bus interface of the master model 320 the fault is applied can be random or can be derived based on criticalness of components. As illustrated in FIG. 3B, the function safety model 322 triggers one or more faults in the master model 320. The function safety model 322 triggers these faults in any suitable location within the master model 320. The suitable location may include which one of the one or more of the one or more logical gates of the interconnected series of functions f0 through fn and/or the bus interface of the master model 320 based on, for example, criticalness of components. After triggering the one or more faults, the function safety model 322 delivers (using, for example, the fault monitor module 332) the one or more faults to fault monitor model 211 for further processing.

During simulation of the master model 320 by the high-level software modeling language, the stuck-at-1 fault module 330*a*, the stuck-at-0 fault module 330*b*, the soft error module 330*c*, and the transient fault module 330*d* alone or in combination with fault monitor 332 can monitor the one or more logical modules 324.1 through 324.*h* and the bus interface for the one or more faults as discussed above in FIG. 1. If the monitoring determines the one or more faults to be present, the stuck-at-1 fault module 330*a*, the stuck-at-0 fault module 330*b*, the soft error module 330*c*, and the transient fault module 330*d* characterize the one or more faults as being the stuck-at-1 fault, the stuck-at-0 fault, the soft error, and the transient fault, respectively. Thereafter, the stuck-at-1 fault module 330*a*, the stuck-at-0 fault module 330*b*, the soft error module 330*c*, and the transient fault module 330*d* provide their characterization of the one or more faults, if any, to the fault monitor 332. The fault monitor module 332 is a local fault monitor module for the master model 320. In contrast, the fault monitor model 211 of FIG. 2 is a global fault monitor module for software model 200. As discussed above, the characterization can include an indication of whether the one or more faults are the stuck-at-1 fault, the stuck-at-0 fault, the soft error, and/or the transient fault. Additionally or alternatively, the characterization can include information about one or more logical gates of the interconnected series of functions f0 through fn and/or the bus interface at which the one or more faults occurred. The fault monitor 332 catalogs the one or more faults as being the stuck-at-1 fault, the stuck-at-0 fault, the soft error, and/or the transient fault and can optionally generate a report of the one or more faults. The fault monitor 332 of function safety model 322 can deliver the one or more faults and/or the report of the one or more faults to fault monitor model 211 for further processing. As discussed above, the fault monitor module 332 is a local fault monitor module for the master model 320. In other words, the fault monitor module 332 can monitor the master model 320 individually at a component level without considering how it works with other master and/or slave models. In contrast, the fault monitor model 211 of FIG. 2 is a global fault monitor model for the software model 200. In other words, the fault monitor module 211 can monitor the software model 200 at a system level considering how the master and/or slave models work with each other within the software model 200.

Exemplary Software Model for Fault Monitor Model

Figure 4:
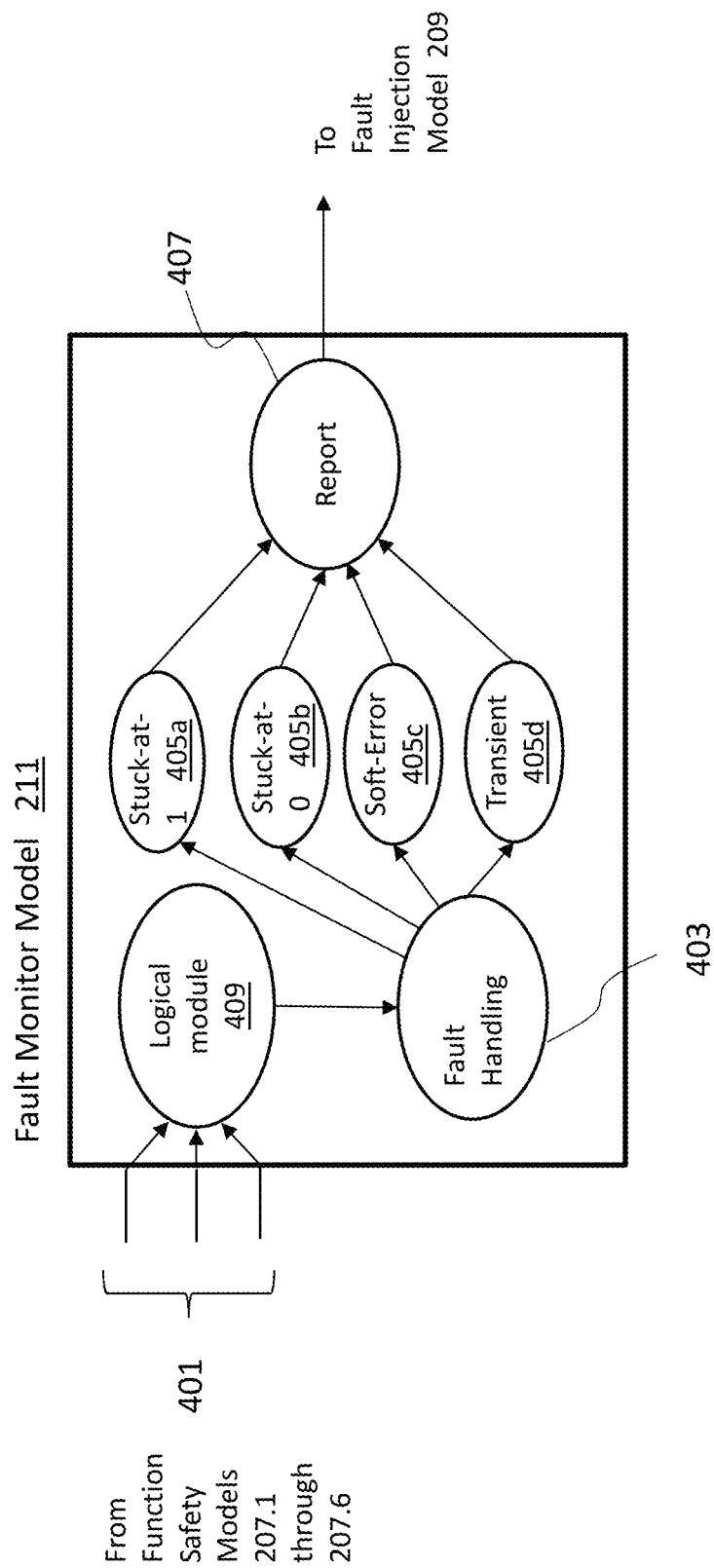
FIG. 4 illustrates exemplary software model for fault monitor model according to an exemplary embodiment of the present disclosure.

FIG. 4 illustrates exemplary software model for fault monitor model 211 according to an exemplary embodiment of the present disclosure. The fault monitor model 211 receives the one or more faults from the one or more function safety models 207.1 through 207.6. For example, the fault monitor model 211 receives one or more faults on inputs 401 from the one or more function safety models 207.1 through 207.6.

As illustrated in FIG. 4, the fault monitor model 211 includes one or more logical modules 409. The one or more logical modules 409 receive inputs 401 from the one or more function safety models 207.1 through 207.6 and generate one or more outputs to fault handling 403. According to some examples, the one or more logical modules 409 can perform an interface between the one or more function safety models 207.1 through 207.6 and the fault handling 403. Additionally or alternatively, the one or more logical modules 409 perform one or more functions of the fault monitor model 211. In an exemplary embodiment, the high-level software modeling language uses software representations of one or more logical gates, such as logical AND gates, logical OR gates, logical XOR gates, logical XNOR gates, and/or logical NOT gates to provide some examples, to model the one or more functions for each of the one or more logical modules 409. Also, as illustrated in FIG. 4, the fault monitor model 211 includes one or more fault handling modules 403. The one or more fault handling modules 403 receive the output of the one or more logical modules 409, process the output of the one or more logical modules 409, and generate inputs to one of the categories 405a-405d. According to some examples, the fault monitor model 211 receives the faults, records types corresponding to the faults, and reports the events to fault injection model 209. For example, after receiving the fault, the logical module 409 and the fault handling 403 of fault monitor model 211 determine the type of the fault and categorizes the fault in one of the categories 405a-405d. After recording the fault type, the fault monitor model 211 uses report 407 to report the fault to the fault injection model 209. According to one example, the report sent to fault injection model 209 can include the master and/or slave model at which the fault was generated, the type of the fault, additional information regarding the fault such as the fault's timing etc. According to some examples, the report function can be extended, by for example, using machine learning algorithm to analyze the fault and predict a next occurrence of the fault.

Exemplary Software Model for Fault Injection Model

Figure 5:
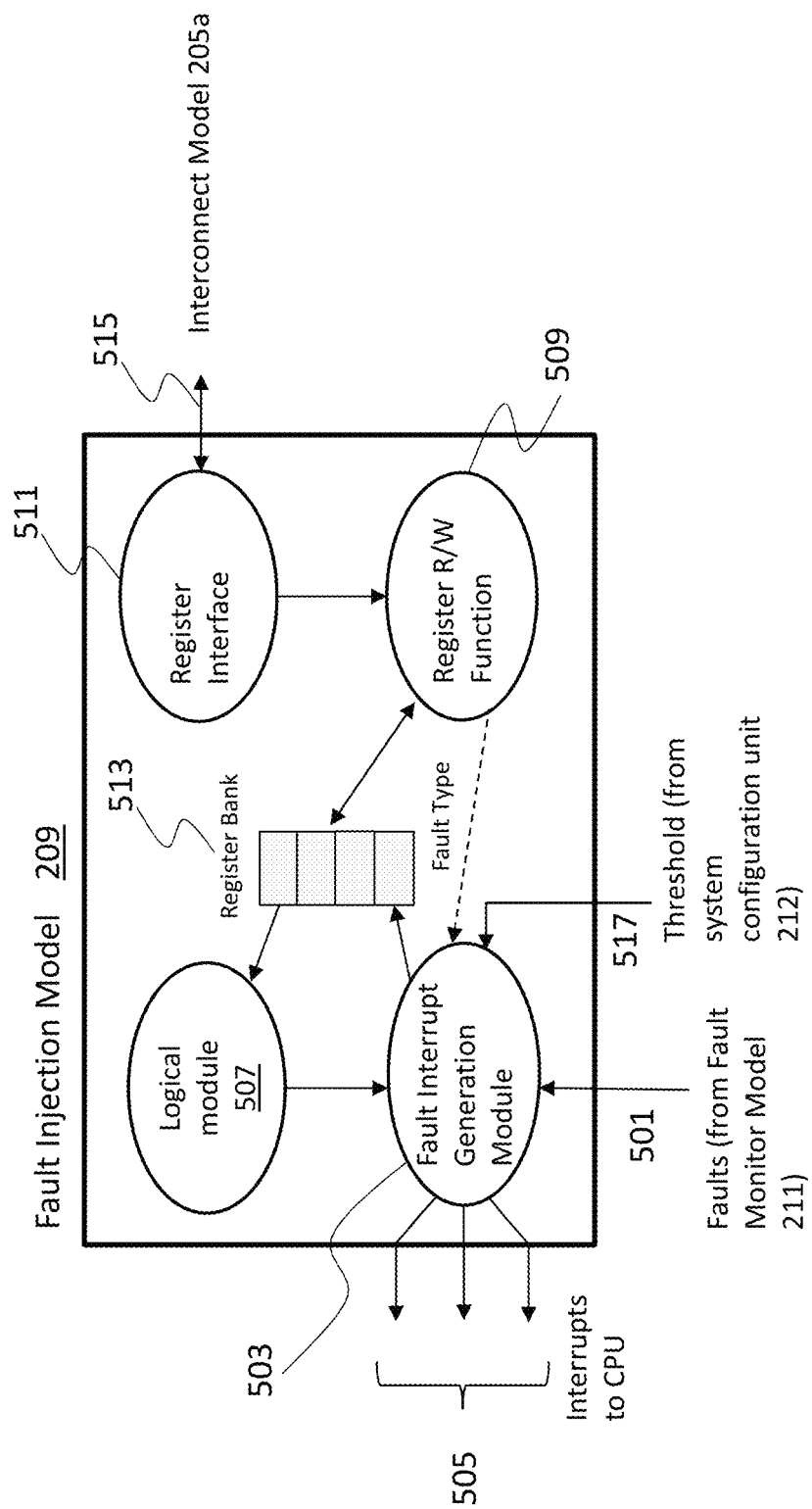
FIG. 5 illustrates exemplary software model for fault injection model according to an exemplary embodiment of the present disclosure.

FIG. 5 illustrates exemplary software model for fault injection model 209 according to an exemplary embodiment of the present disclosure. In one example, the fault injection model 209 receives the one or more faults from the fault monitor model 211 on input 501. For example, the fault injection model 209 receives the one or more faults from the fault monitor model 211 through the report generated by the fault monitor model 211. After receiving the one or more faults on input 501, the fault injection model 209 is configured to generate and send interrupts to CPU model 203 such that CPU model 203 can address the one or more faults. According to an exemplary embodiment, the fault injection model 209 can include fault interrupt generation module 503. Fault interrupt generation module 503 is configured to receive one or more faults on input 501 and to generate the interrupt to CPU model 203 and send the interrupt through outputs 505. It is noted that although three output lines are illustrated, output 505 can include only one interrupt line or more than one interrupt lines.

According to some examples, the fault injection model 209 using, for example, fault interrupt generation module 503, is configured to receive the fault from the from fault monitor model 211 and increase a value of a fault counter in an accumulator. The fault injection model 209 using, for example, fault interrupt generation module 503, is further configured to compare the value of the fault counter with a threshold value before generating the interrupt signal. In one example, the threshold value can be stored in the system configuration unit model 212 and is used to control the number of fault events. The fault interrupt generation module 503 can receive the threshold value from the system configuration unit model 212 on input 517. According to some embodiments, the system configuration unit model 212 can be included in fault injection model 209 and can be configured to store the threshold value. Additionally or alternatively, the system configuration unit model 212 can be located external to fault injection model 209 and can be configured to store the threshold value. In some examples, the fault injection model 209 using, for example, fault interrupt generation module 503, can have one fault counter for each one type of fault. After receiving the fault, the fault injection model 209 using, for example, fault interrupt generation module 503, can increase the value of the fault counter associated with the type of the received fault in the accumulator. Further, the fault injection model 209 using, for example, fault interrupt generation 503, can compare the value of the fault counter with its associated threshold. According to some examples, each fault type can have its associated threshold value. When the value of fault counter exceeds the threshold, the fault injection model 209 using, for example, fault interrupt generation 503, can generate the interrupt to CPU model 203.

When CPU model 203 receives the interrupt, CPU model 203 can send an acknowledgement (ACK) back to the fault injection model 209 through interconnect module 205a and input 515. The fault injection model 209 can communicate with other model components of system 200 through, for example, interconnect model 205a. Depending on the fault, CPU model 203 can trigger the necessary processing to handle the fault. According to one example, CPU model 203 can use GPIO model 205c to signal to devices external to CPU model 203 to handle the fault. However, the embodiments of this disclosure are not limited to this example, and CPU model 203 can take any necessary step to handle the fault.

In one example, when fault monitor model 211 sends the one or more faults to the fault injection model 209, the fault injection model 209 stores the one or more faults in register bank 513 of the fault injection model 209. In some examples, the fault injection model 209 stores the one or more faults in the register bank 513 based on a first come first served basis. Additionally, or alternatively, the fault injection model 209 stores the one or more faults in the register bank 513 based on the type of the one or more faults. According to some example, when CPU model 203 receives the interrupt from the fault injection model 209, CPU model 203 can read the one or more faults (and/or any information associated with the one or more faults, such as, but not limited to, the type of the fault, the component model where the fault occurred, the timing information of the fault, etc.) from the register bank 513.

As illustrated in FIG. 5, fault injection model 209 further includes one or more logical modules 507, a register 511, and a register read/write (R/W) function 509. The one or more logical modules 507 are each designed to perform series of functions of the fault injection model 209. In an exemplary embodiment, the high-level software modeling language uses software representations of one or more logical gates, such as logical AND gates, logical OR gates, logical XOR gates, logical XNOR gates, and/or logical NOT gates to provide some examples, to model the functions of each of the one or more logical modules 507. Also, the high-level software modeling language uses software representations of the one or more logical gates to model a register read/write (R/W) function 509 to read and/or write data from/to the register 511 and/or register bank 513.

According to some examples, register bank 513 can be used to store interrupt status for the received faults. When the fault interrupt generation module 503 sends an interrupt through output 505 to CPU model 203 for a received fault, the fault interrupt generation module 503 sends, for example, a bit value 1 on the output 505. Additionally, the fault interrupt generation module 503 can write, for example, a bit value 1 on the register bank 513 for the received fault to indicate that an interrupt has been sent to the CPU model 203. When CPU model 203 receives the interrupt, the CPU model 203 can send an ACK to fault injection model 209 through, for example, interconnect model 205a. The register interface 511 has an input connected to the interconnect model 205a and an output connected to the register R/W function 509. The register R/W function 509 can receive the ACK through register interface 511 (which can act as an interface) from interconnect model 205a. In response, the register R/W function 509 can change the value of the register bank 513 associated with the received fault to bit value 0.

Logical module 507 can read the bit value 0 from the register bank 513. In one example, logical module 507 can be configured to periodically read the register bank 513 to detect any change in the register bank 513. Additionally or alternatively, in addition to changing the value of the register bank 513 associated with the received fault, the register R/W function 509 can send an output to the logical module 507 to indicate to the logical module 507 that the value of the register bank 513 associated with the received fault has changed. In addition or in alternate, the register bank 513 can be configured to send an output to the logical module 507 to indicate to the logical module 507 that the value of the register bank 513 associated with the received fault has changed. The logical module 507 is connected to the fault interrupt generation module 503. After detecting that the value of the register bank 513 associated with the received fault has changed to bit value 0, the logical module 507 sends an output to the fault interrupt generation module 503. Then the fault interrupt generation module 503 changes the interrupt from bit value 1 to bit value 0 on output 505 associated with the received fault (e.g., clears the interrupt). This indicates that fault injection model 209 has received the ACK from CPU model 203.

According to some embodiments, when the register R/W function 509 changes the value of the register bank 513 associated with the received fault to bit value 0, the register R/W function 509 can send an output to the fault interrupt generation module 503 too. By receiving the output from the register R/W function 509, the fault interrupt generation module 503 changes the interrupt from bit value 1 to bit value 0 on output 505 associated with the received fault (e.g., clears the interrupt).

In one example, in handling the fault, CPU model 203 discards the component model (e.g., one or more of models 205a through 205d) that had the fault and CPU model 203 initiates another component model to perform the operations of the component model that had the fault (e.g., using a redundant path and/or component model). For example, if the generated (simulated and/or triggered fault) was generated by function safety model 207.3 in I2C model, CPU model 203 can discard I2C model 205b and ask another I2C model to perform the operations of I2C model 205b. Additionally, or alternatively, CPU model 203 can restart (e.g., reset) the component model that had the fault (in this example, I2C model 205b.)

Simulating the Model of the Electronic Device

After completion of the modeling of the electronic device 100, the ESL design and verification of the present disclosure utilizes the simulation algorithm in conjunction with CPU model 203, interconnect model 205a, I2C model 205b, GPIO model 205c, SRAM model 205d, function safety model 207, the fault injection model 209, and the from fault monitor model 211, to simulate and model the functional safety of these components and provide fault management of these components of electronic device 100.

Figure 6:
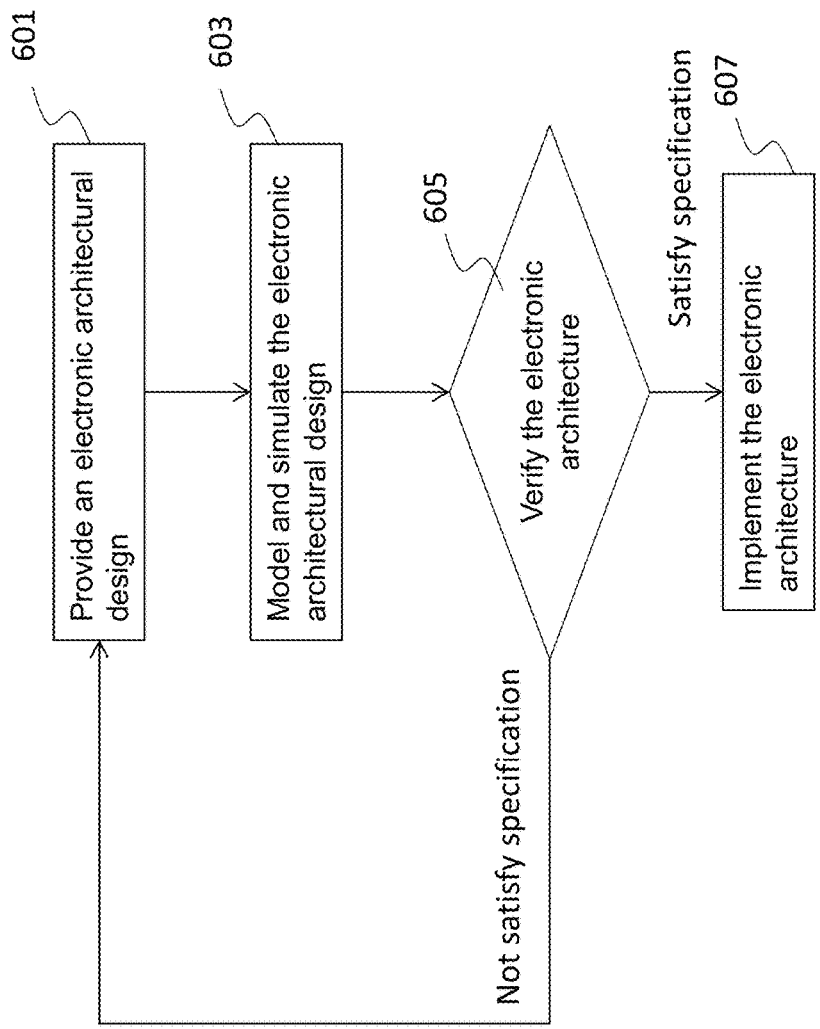
FIG. 6 illustrates a flowchart of an exemplary operational control flow incorporating a simulation algorithm of the electronic device according to an exemplary embodiment of the present disclosure.

FIG. 6 illustrates a flowchart of an exemplary operational control flow incorporating a simulation algorithm of the electronic device according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 600 in designing and manufacturing the electronic device 100. In an exemplary embodiment, the exemplary operational control flow 600, as well as other exemplary methods to be discussed herein, can be implemented in hardware, firmware, software, or any combination thereof. As another example, the exemplary operational control flow 600, as well as other exemplary methods to be discussed herein, can be implemented as instructions stored on a machine-readable medium, which may be read and executed by one or more processors. For example, operational control flow 600, as well as other exemplary methods to be discussed herein, can be implemented using the computer system 800. A machine-readable medium may include any mechanism for storing or transmitting information in a form readable by a machine (e.g., a computing device). A machine-readable medium can include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, or other devices that will be apparent to those skilled in the relevant art(s) executing the firmware, software, routines, and/or instructions.

At 601, an electronic architectural design for the electronic device 100 is provided. The operation 601 can be performed, for example, using the computer system 800. In one example, providing the electronic architectural design for the electronic device 100 can include developing the electronic architectural design for the electronic device. In an exemplary embodiment, the electronic architectural design represents a software implementation of one or more master devices 103, one or more slave devices 105.1 through 105.a, one or more safety circuits SM 107 and/or 109.1 through 109.a, one or more sensors 111.1 through 111.b of the electronic device 100 as described in FIG. 1. The electronic architectural design can be provided and/or developed in accordance with an electronic design specification. The electronic design specification can outline one or more requirements for one or more functional behaviors for the electronic architectural design. According to some examples, the functional behavior can include suitable functions performed within an automobile and/or any other motorized vehicle. For example, functions from setting seats, mirrors, climate control, and headlights to advanced engine control of the automobiles. For example, the functional behavior can include monitoring and/or controlling one or more anti-lock braking (ABS) sensors, one or more traction control system sensors, one or more steering lock sensors, one or more speed sensors, one or more yaw rate sensors, etc. In some situations, functional behavior can include functions to ensure functional safety of the components of electric device 100 and/or to provide fault management of these components.

In an exemplary embodiment, the electronic architectural design represents an ESL synthesis, also referred to as a high-level synthesis (HLS), of the electronic architectural design using a high-level software language. Generally, the high-level software language interprets an algorithmic description of the electronic device 100 to create the software implementation of analog and/or digital circuits as the electronic architectural design. For example, the high-level software language creates a software implementation of analog and/or digital circuits of the electronic device 100 as described in FIG. 1. The high-level software language can include a graphical design tool, for example systemC, C, C++, LabVIEW, and/or MATLAB, a general purpose system design language, such as a Systems Modeling Language (SysML), a Semantic Model Definition Language (SMDL) and/or a schema definition language (SSDL), or any other suitable high-level software language that will be apparent to those skilled in the relevant art(s) without departing from the spirit and scope of the present disclosure.

At 603, the electronic architectural design from 601 is simulated to determine whether one or more functional behaviors of the electronic architectural design from 601, satisfies the electronic design specification from 601. The operation 603 can be performed, for example, using the computer system 800. Before this electronic simulation occurs, the electronic architectural design from 601 is modeled using the high-level software language. For example, CPU model 203, interconnect model 205a, I2C model 205b, GPIO model 205c, SRAM model 205d, system configuration unit model 212, function safety model 207, fault injection model 209, and/or fault monitor model 211 as described in FIG. 2, are generated using the high-level software language. According to some embodiments, the modeling using the high-level software language can include generating and/or determining function safety model 207 by, for example, the computer system 800 to describe generation of one or more faults. Additionally or alternatively, the modeling can include generating and/or determining fault injection model 209 by, for example, the computer system 800 to describe triggering an action from the electronic device in response to the one or more faults. In addition or alternatively, the modeling can include generating and/or determining fault monitor model 211 by, for example, the computer system 800 to describe recordation of the one or more faults.

After completion of the modeling of the electronic architectural design, the operational control flow 600 utilizes a simulation algorithm, such as SPICE, Verilog, or VHDL to provide some examples, in conjunction with the high-level software model of the electronic architectural design to simulate the function safety mechanisms and fault management of the electronic device 100 while the electronic architectural design provided at 601 is performing the one or more functional behaviors. In some situations, the simulation algorithm utilizes a text netlist describing the electronic architectural design provided at 601 and translates this text netlist into one or more equations, such as nonlinear differential algebraic equations to provide an example, to be solved. In these situations, the simulation algorithm, for example, can provide an alternating current (AC) analysis, such as a linear small-signal frequency domain analysis, and/or a direct current (DC) analysis, such as a nonlinear quiescent point calculation or a sequence of nonlinear operating points calculated while sweeping an input voltage or current or a parameter, of the electronic architectural design from step 601. The simulation of step 603 is further described in FIGS. 7A and 7B.

At 605, the computer system 800 verifies whether the one or more simulated functional behaviors of the electronic architectural design from 603 satisfies the electronic design specification from 601. For example, the computer system 800 verifies functional safety of the components of the electronic device 100 and fault management of the components of the electronic device 100 while the electronic architectural design provided at 601 is performing the one or more functional behaviors. As a non-limiting example, one functional behavior of the electronic architectural design can include CPU model 203 using interconnect model 205a to read a maximum threshold speed from SRAM model 205d. According to this exemplary embodiment, a fault can be applied in, for example, interconnect model 205a that can affect CPU model 203 using interconnect model 205a to read a maximum threshold speed from SRAM model 205d. The computer system 800 using operational control flow 600 can verify functional safety and fault management for the fault at interconnect model 205a while the functional behavior discussed above is being performed.

According to some embodiments, verifying whether the one or more simulated functional behaviors of the electronic architectural design from 603 satisfies the electronic design specification from 601 can include determining whether one or more of function safety model 207, fault injection model 209, fault monitor model 211, and CPU model 203 (and/or any other related component model) were able to determine one or more faults that were simulated. For example, verification step 605 can include the computer system 800 determining whether a dangerous fault was detected, whether a dangerous fault was not detected, whether a safe fault was detected, whether a safe fault was not detected. The type of the fault, where the fault was generated, whether it was detected can be based on the electronic design specification from 601.

Additionally, or alternatively, verifying whether the one or more simulated functional behaviors of the electronic architectural design from 603 satisfies the electronic design specification from 601 can include the computer system 800 determining whether one or more of function safety model 207, fault injection model 209, fault monitor model 211, and CPU model 203 (and/or any other related component model)

detected the one or more faults that were simulated within an "acceptable" time period. The "acceptable" time period can be determined based on the electronic design specification from 601.

Additionally, or alternatively, verifying whether the one or more simulated functional behaviors of the electronic architectural design from 603 satisfies the electronic design specification from 601 can include the computer system 800 determining whether one or more of function safety model 207, fault injection model 209, fault monitor model 211, and CPU model 203 (and/or any other related component model) responded to the one or more faults that were simulated "appropriately." According to some example, the appropriate response to the one or more faults can be based on the electronic design specification from 601.

The operational control flow 600 proceeds to 607 when the simulated one or more functional behaviors of the electronic architectural design from 603 satisfies the electronic design specification from 601. Otherwise, the simulated one or more functional behaviors of the electronic architectural design from 603 do not satisfy the electronic design specification from 601. In this situation, the operational control flow 600 reverts to 601 to alter the electronic architectural design from 601 and/or the electronic design specification from 601. the computer system 800

At 607, the electronic architectural design provided at 601 is fabricated onto an integrated circuit (IC) semiconductor substrate when the simulated one or more functional behaviors of the electronic architectural design from 603 satisfy the electronic design specification from 601 to form the electronic device 100. The operation 607 can be performed, for example, using the computer system 800. The computer system 800, for example, creates a representation of the electronic architectural design from 603 in terms of planar geometric shapes which correspond to diffusion layers, polysilicon layers, metal layers, and/or interconnections between layers. Thereafter, the computer system 800 translates these planar geometric shapes into one or more photomasks for fabrication onto the IC semiconductor substrate. In some situations, the electronic architectural design from 601 is converted into an industry standard file format before this translation can occur. For example, the electronic architectural design from 601 can be converted to a version of a Graphic Database System (GDS) format. Once the electronic architectural design of 601 is fabricated onto the IC semiconductor substrate using the one or more photomasks to form the electronic device 100, the electronic device 100 can be tested in a laboratory environment to verify one or more functional behaviors of electronic device 100 satisfies the electronic design specification from 601.

Exemplary Simulation Algorithms

Figure 7A:
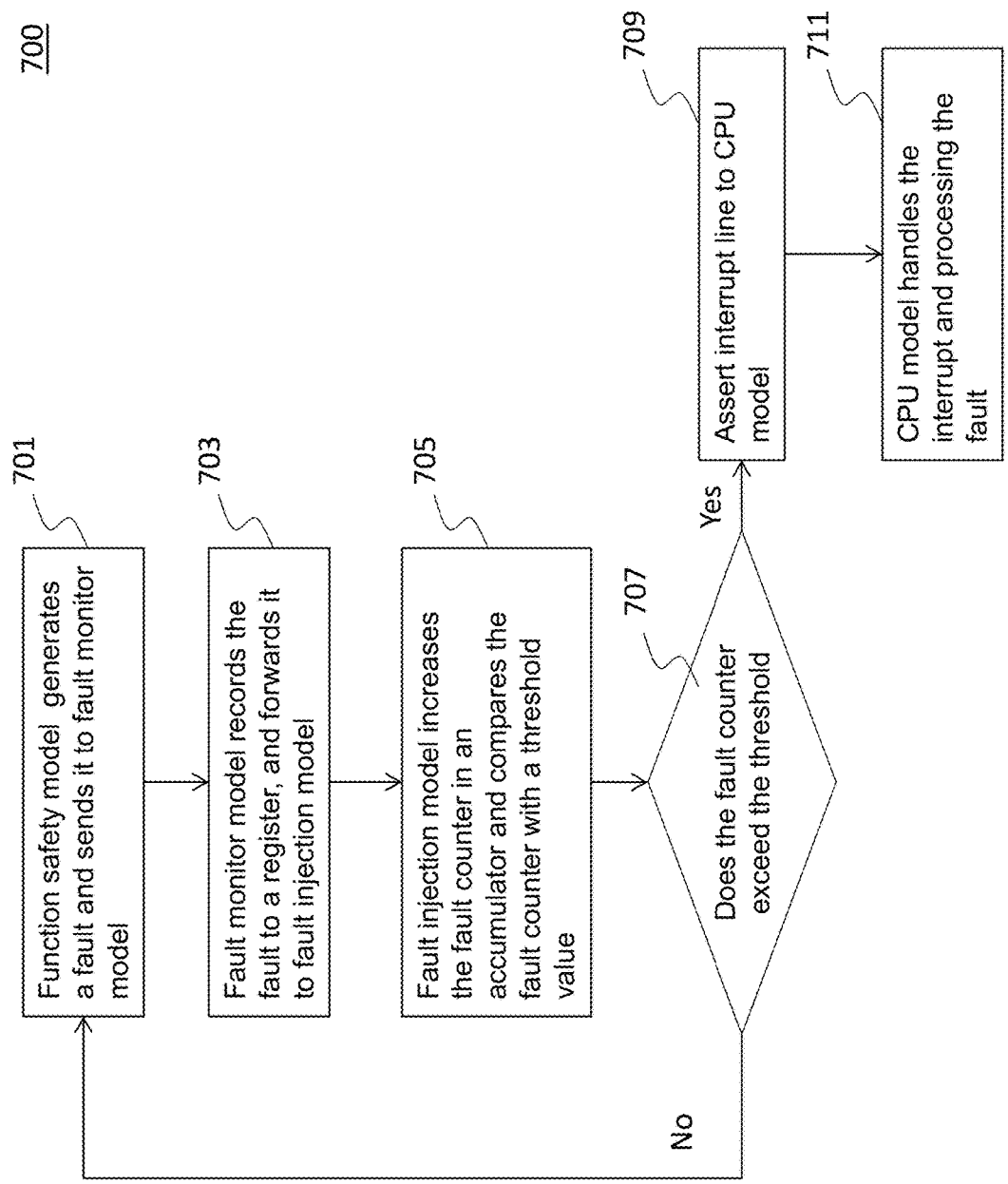
FIG. 7A is a flowchart illustrating an exemplary operational flow according to an embodiment of this disclosure.

FIG. 7A is a flowchart illustrating an exemplary operational flow according to an embodiment of this disclosure. Method 700 of FIG. 7A can be performed by processing logic that can comprise hardware (e.g., circuits, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7A, as will be understood by a person of ordinary skill in the art.

Method 700 shall be described with reference to FIGS. 2-6. However, method 700 is not limited to these example embodiments. According to one example, method 700 can include the simulation of step 603 of FIG. 6.

At 701, function safety model 207 generates a fault and sends the generated fault to fault monitor model 211. At 703, fault monitor model 211 records the generated fault to a register, and then forwards it to fault injection model 209. At 705, the fault injection model 209 increases the value of a fault counter in an accumulator and compares the value of the fault count with a threshold value.

If the value of the fault counter exceeds the threshold, at 709 the fault injection model 209 generates and sends an interrupt to, for example, CPU model 203. At 711, CPU model 203 handles the interrupt and the fault's processing. According to some embodiments, if the value of the fault counter does not exceed the threshold, process 700 can revert back to step 701.

According to one example, method 700 is performed when the fault is generated and/or determined in a slave model, such as, Interconnect model 205*a*, I2C model 205*b*, GPIO model 205*c*, and/or SRAM model 205*d* and any other slave model.

Figure 7B:
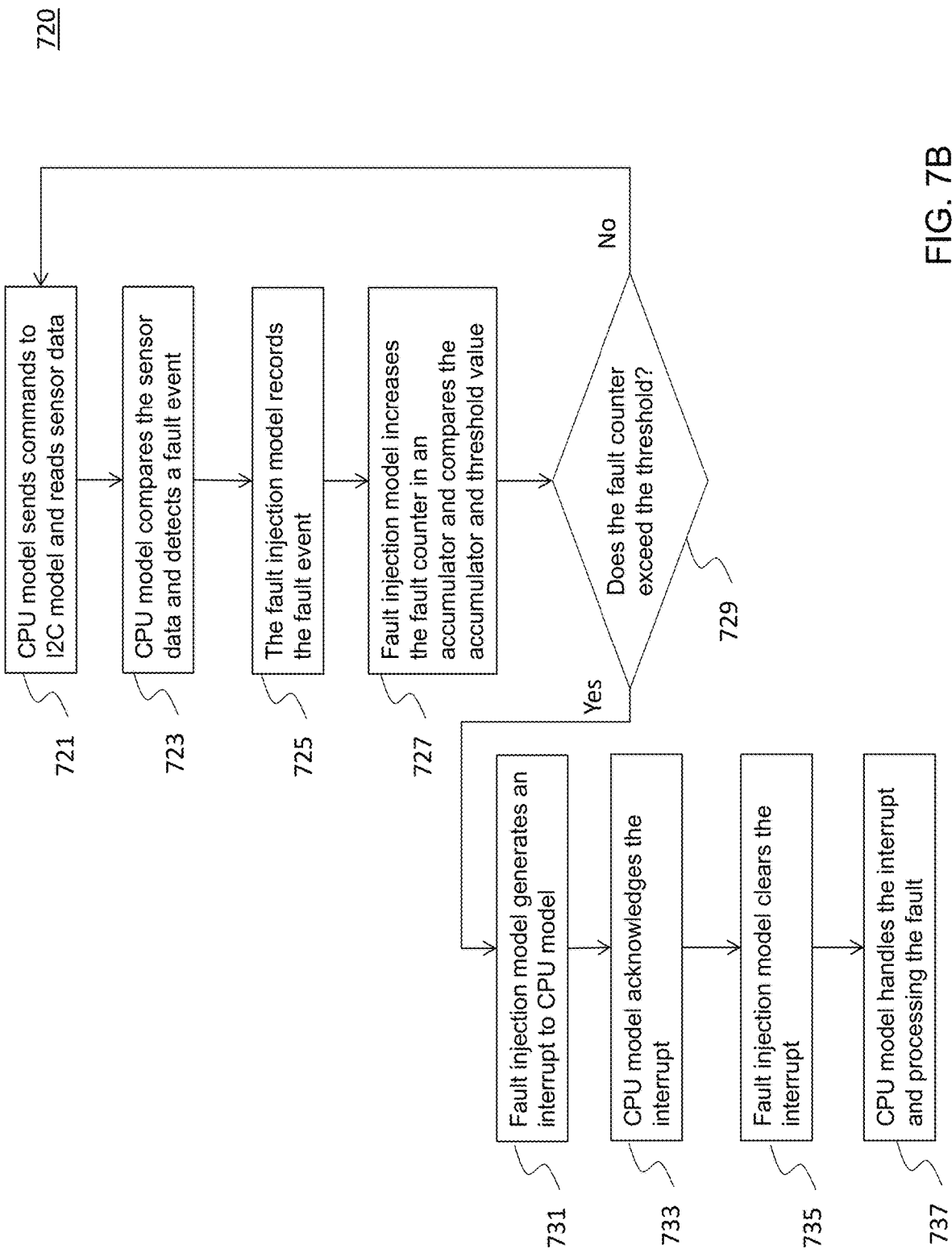
FIG. 7B is a flowchart illustrating another exemplary operational flow according to another embodiment of this disclosure.

FIG. 7B is a flowchart illustrating another exemplary operational flow according to another embodiment of this disclosure. Method 720 of FIG. 7B can be performed by processing logic that can comprise hardware (e.g., circuits, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7B, as will be understood by a person of ordinary skill in the art.

Method 720 shall be described with reference to FIGS. 2-6. However, method 720 is not limited to these example embodiments. According to one example, method 720 is performed when the fault type is determined by a master model, such as, CPU model 203 and any other master model. According to one example, method 720 can include the simulation of step 603 of FIG. 6.

According to one example, at 721, CPU model 203 sends commands to, for example, I2C model 205*b* and reads sensor data through I2C model 205*b* and using, for example, models of sensors. At 723, CPU model 203 compares the sensor data and detects a fault event. At 725, the fault injection model 209 records the fault event.

At 727, fault injection model 209 increases the value of a fault counter in an accumulator and compares the value of the fault counter with a threshold value. If the fault counter does not exceed the threshold, process 720 moves back to step 721. If the fault counter exceeds the threshold, at 731, the fault injection model 209 generates an interrupt to CPU model 203. At 733, CPU model 203 sends an acknowledgment back to the fault injection model 209. At 735, the fault injection model 209 clears the interrupt. At 737, CPU model 203 handles the interrupt and the fault's processing.

Exemplary Computer System for Simulating and Modeling the Electronic Device

Figure 8:
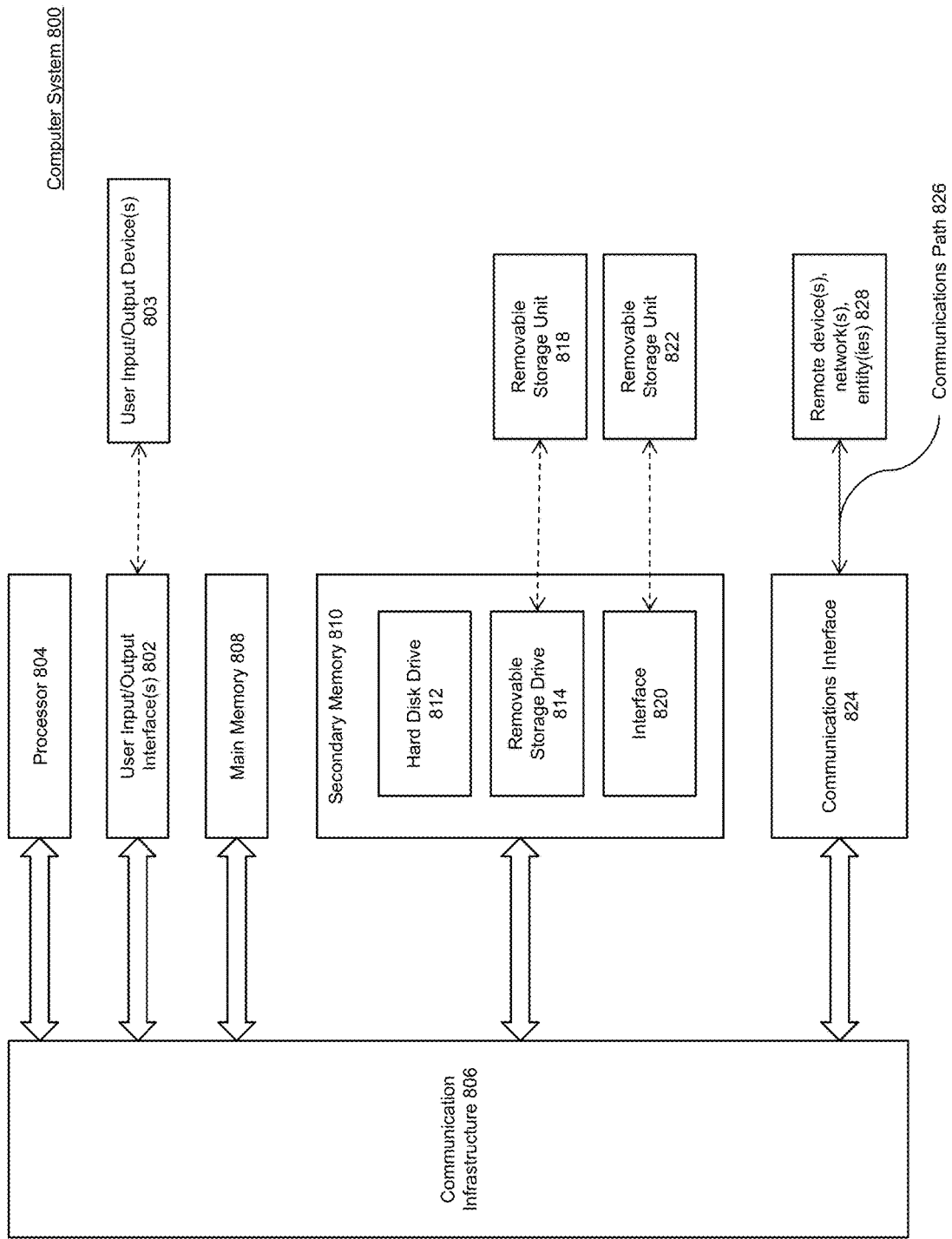
FIG. 8 illustrates a block diagram of an exemplary computer system for simulating and modeling the exemplary electronic device according to an exemplary embodiment of the present disclosure.

FIG. 8 illustrates a block diagram of an exemplary computer system 800 for simulating and modeling the exemplary electronic device according to an exemplary embodiment of the present disclosure. Various embodiments are described in terms of this example computer system 800. After reading this description, it will become apparent to a person skilled in the relevant art how to implement embodiments using other computer systems and/or computer architectures.

The computer system 800 includes one or more processors 804, also referred to as central processing units, or CPUs, to simulate and/or model the electronic device 100 and/or the electronic architectural design as described above in FIG. 1 through FIG. 7. The one or more processors 804 can be connected to a communication infrastructure or bus 806. In an exemplary embodiment, one or more of the one or more processors 804 can be implemented as a graphics processing unit (GPU). The GPU represents a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

The computer system 800 also includes user input/output device(s) 803, such as monitors, keyboards, pointing devices, etc., which communicate with communication infrastructure 806 through user input/output interface(s) 802.

The computer system 800 also includes a main or primary memory 808, such as a random access memory (RAM) to provide an example. The main memory 808 can include one or more levels of cache. The main memory 808 has stored therein control logic (i.e., computer software) and/or data, such as the simulation algorithm as described in FIG. 1 through FIG. 7 and/or any of the models for the electronic device 100 and/or the electronic architectural design as described in FIG. 1 through FIG. 7.

The computer system 800 can also include one or more secondary storage devices or memory 810 to store the simulation algorithm as described in FIG. 1 through FIG. 7 and/or any of the models for the electronic device 100 and/or the electronic architectural design as described in FIG. 1 through FIG. 7 to provide some examples. The one or more secondary storage devices or memory 810 can include, for example, a hard disk drive 812 and/or a removable storage device or drive 814. The removable storage drive 814 may be a floppy disk drive, a magnetic tape drive, a compact disk drive, an optical storage device, tape backup device, and/or any other storage device/drive. The removable storage drive 814 may interact with a removable storage unit 818. The removable storage unit 818 includes a computer usable or readable storage device having stored thereon computer software (control logic) and/or data. The removable storage unit 818 may be a floppy disk, magnetic tape, compact disk, DVD, optical storage disk, and/any other computer data storage device. The removable storage drive 814 reads from and/or writes to removable storage unit 818 in a well-known manner.

According to an exemplary embodiment, the one or more secondary storage devices or memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 800 may further include a communication or network interface 824. The communication or network interface 824 enables the computer system 800 to communicate and interact with any combination of remote devices, remote networks, remote entities, etc. (individually and collectively referenced by reference number 828). For example, the communication or network interface 824 may allow the computer system 800 to communicate with the remote devices 828 over a communications path 826, which may be wired and/or wireless, and which may include any combination of LANs, WANs, the Internet, etc. Control logic and/or data may be transmitted to and from the computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, the computer system 800, the main memory 808, the secondary memory 810, and the removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 8. In particular, embodiments may operate with software, hardware, and/or operating system implementations other than those described herein.

CONCLUSION

The foregoing Detailed Description discloses a method for simulating a safety circuit of an electronic device. The method includes providing an electronic architectural design to perform one or more functional behaviors of the electronic device in accordance with an electronic design specification The method further includes modeling the safety circuit of the electronic architectural design and one or more other electronic circuits of the electronic architectural design that communicate with the safety circuit. The method further includes simulating, using the modeling, operation of the safety circuit while the electronic architectural design is performing the one or more functional behaviors. The method also includes determining whether the simulated operation of the safety circuit satisfies the electronic design specification. At least one of the providing, the modeling, the simulating, and the determining are performed by a computer system.

The foregoing Detailed Description also discloses a computer system for simulating a safety circuit of an electronic device. The computer system includes a memory that stores instructions and a processor, in communication with the memory and configured to execute the instructions. The instructions, when executed by the processor, further configure the processor to model the safety circuit by generating a function safety model to describe generation of one or more faults, generating a fault monitor model to describe recordation of the one or more faults, and generating a fault injection model to describe triggering an action from the electronic device in response to the one or more faults. The instructions, when executed by the processor, further configure the processor to simulate, using the modeling, operation of the safety circuit and determine whether the simulated operation of the safety circuit satisfies an electronic design specification.

The foregoing Detailed Description further discloses a non-transitory computer-readable medium having instructions stored thereon that, when executed by a computer system, causes the computer system to perform operations. The operations include providing an electronic architectural design to perform one or more functional behaviors of the electronic device in accordance with an electronic design specification. The operations further include modeling a safety circuit of the electronic architectural design and one or more other electronic circuits of the electronic architectural design that communicate with the safety circuit. The modeling includes generating a function safety model to describe generation of one or more faults and generating a fault monitor model to describe recordation of the one or more faults. The operations further include simulating, using the modeling, operation of the safety circuit while the electronic architectural design is performing the one or more functional behaviors.

The foregoing Detailed Description outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method for simulating a safety circuit of an electronic device, the method comprising:
   providing an electronic architectural design;
   generating a first function safety model of a first slave model to describe generation of a first plurality of faults;
   generating a first fault monitor model of the first slave model to describe a first recordation of the first plurality of faults;
   generating a second function safety model of a second slave model to describe generation of a second plurality of faults;
   generating a second fault monitor model of the second slave model to describe a second recordation of the second plurality of faults; and
   generating a fault injection model of a master model to receive the first and second recordations and to describe triggering an action from the electronic device in response to the first and second pluralities of faults.

2. The method of claim 1, wherein the electronic architectural design is configured to perform one or more functional behaviors of the electronic device in accordance with an electronic design specification.

3. The method of claim 1, further comprising:
   recording, by a computer system using the first and second fault monitor models, the first and second pluralities of faults to a register; and
   forwarding, by the computer system using the first and second fault monitor models, the first and second pluralities of faults to the fault injection model.

4. The method of claim 3, further comprising:
   increasing, by the computer system and using the fault injection model, a value of a fault counter;
   comparing, by the computer system and using the fault injection model, the value of the fault counter to a threshold value; and
   in response to the value of the fault counter exceeding the threshold value, sending, by the computer system and using the fault injection model, an interrupt to a processing model to handle the first and second pluralities of faults.

5. The method of claim 2, further comprising:
   simulating an operation of the safety circuit while the electronic architectural design is performing the one or more functional behaviors; and
   determining whether the simulated operation of the safety circuit satisfies the electronic design specification.

6. The method of claim 5, wherein:
   simulating of the operation of the safety circuit comprises generating an other fault using the safety circuit in one or more electronic circuits of the electronic architectural design, and
   determining comprises determining whether the other fault is detected in the simulated operation of the safety circuit.

7. A computer system for simulating a safety circuit of an electronic device, the computer system comprising:
   a memory that stores instructions; and
   a processor, in communication with the memory, configured to execute the instructions, wherein the instructions, when executed by the processor, configure the processor to:
   generate a first function safety model of a first slave model to describe generation of a first plurality of faults;
   generate a second function safety model of a second slave model to describe generation of a second plurality of faults;
   generate a fault monitor model of a master model to describe first and second recordations of the first and second pluralities of faults, respectively; and
   generate a fault injection model of the master model to receive the first and second recordations and describe triggering an action from the electronic device in response to the first and second pluralities of faults.

8. The computer system of claim 7, wherein the instructions, when executed by the processor, further configure the processor to:
   provide an electronic architectural design to perform one or more functional behaviors of the electronic device in accordance with an electronic design specification.

9. The computer system of claim 7, wherein the instructions, when executed by the processor, further configure the processor to:
   generate the first and second pluralities of faults; and
   send the first and second pluralities of faults to the fault monitor model.

10. The computer system of claim 9, wherein the instructions, when executed by the processor, further configure the processor to:
    record the first and second pluralities of faults to first and second registers of the first and second slave models, respectively; and
    forward the first and second pluralities of faults to the fault injection model of the master model.

11. The computer system of claim 10, wherein the instructions, when executed by the processor, further configure the processor to:
    increase a value of a fault counter;
    compare the value of the fault counter to a threshold value; and
    in response to the value of the fault counter exceeding the threshold value, send an interrupt to a processing model to handle the first and second pluralities of faults.

12. The computer system of claim 8, wherein the instructions, when executed by the processor, further configure the processor to:
  generate an other fault in one or more electronic circuits of the electronic architectural design; and
  determine whether the other fault is detected in response to simulating the safety circuit.

13. The computer system of claim 7, wherein the instructions, when executed by the processor, further configure the processor to:
  simulate an operation of the safety circuit; and
  determine whether the simulated operation of the safety circuit satisfies an electronic design specification.

14. A non-transitory computer-readable medium having instructions stored thereon that, when executed by a computer system, causes the computer system to perform operations comprising:
  generating a first plurality of faults of a first slave model;
  generating a second plurality of faults of a second slave model;
  generating a fault monitor model of a master model to describe first and second recordations of the first and second pluralities of faults, respectively; and
  generating a fault injection model of the master model to:
    receive the first and second recordations; and
    describe triggering an action from an electronic device in response to the first and second pluralities of faults.

15. The non-transitory computer-readable medium of claim 14, wherein the operations further comprise:
  providing an electronic architectural design to perform one or more functional behaviors of the electronic device in accordance with an electronic design specification; and
  determining whether the action from the electronic device satisfies the electronic design specification.

16. The non-transitory computer-readable medium of claim 15, wherein the operations further comprise generating an other fault using the received first and second recordations.

17. The non-transitory computer-readable medium of claim 14, wherein the operations further comprise:
  sending the first and second pluralities of faults to the fault monitor model; and
  recording the first and second pluralities of faults to first and second registers, respectively.

18. The non-transitory computer-readable medium of claim 14, wherein the operations further comprise:
  forwarding, using the fault monitor model, the first and second pluralities of faults to the fault injection model;
  increasing, using the fault injection model, a value of a fault counter;
  comparing, using the fault injection model, the value of the fault counter to a threshold value; and
  in response to the value of the fault counter exceeding the threshold value, sending, using the fault injection model, an interrupt to a processing model to handle the first and second pluralities of faults.

19. The non-transitory computer-readable medium of claim 14, wherein the operations further comprise controlling the first and second slave models using the master model.

20. The non-transitory computer-readable medium of claim 14, wherein the master model comprises a Central Processing Unit (CPU) and the first and second slave models respectively comprise an Inter Integrated Circuit (I2C) and an Interconnection Circuit (AXI).

* * * * *